United States Patent [19]

Ando et al.

[11] Patent Number: 5,447,983
[45] Date of Patent: Sep. 5, 1995

[54] METHOD FOR PRODUCING A LARGE SIZE CROSSLINKED POLYMER BEAD

[75] Inventors: Kiyoto Ando; Hiroshi Arataki, both of Kitakyushu, Japan

[73] Assignee: Mitsubishi Chemical Corporation, Tokyo, Japan

[21] Appl. No.: 384,682

[22] Filed: Feb. 6, 1995

Related U.S. Application Data

[63] Continuation of Ser. No. 991,580, Dec. 16, 1992, abandoned.

[30] Foreign Application Priority Data

Dec. 18, 1991 [JP] Japan .................. 3-335276

[51] Int. Cl.$^6$ ............................................. C08F 2/10
[52] U.S. Cl. ......................... 524/458; 524/459; 524/732; 524/733; 524/734; 524/794; 526/200; 526/201; 526/202; 526/206
[58] Field of Search ............... 524/458, 459, 732, 733, 524/734, 794; 526/200, 201, 202, 206

[56] References Cited

U.S. PATENT DOCUMENTS

| | | | |
|---|---|---|---|
| 2,992,544 | 7/1961 | McMaster | 525/331.4 |
| 3,440,219 | 4/1969 | Wolff et al. | 524/794 |
| 3,496,123 | 2/1970 | Wolff et al. | 526/201 |
| 3,637,535 | 1/1972 | Corte et al. | 526/200 |
| 4,207,398 | 6/1980 | Riener | 525/359.3 |
| 4,543,365 | 9/1985 | Itagaki et al. | 525/332.1 |
| 4,730,027 | 3/1988 | Millington et al. | 526/202 |
| 4,870,143 | 9/1989 | Hashiguchi et al. | 526/202 |
| 4,911,736 | 3/1990 | Huang et al. | 526/270 |
| 5,061,741 | 10/1991 | Miyata et al. | 526/88 |
| 5,086,079 | 2/1992 | Reese et al. | 526/201 |

FOREIGN PATENT DOCUMENTS 1011103 1/1989 Japan .

*Primary Examiner*—Joseph L. Schofer
*Assistant Examiner*—Tom Weber
*Attorney, Agent, or Firm*—Oblon, Spivak, McClelland, Maier & Neustadt

[57] ABSTRACT

A method for producing a large size crosslinked polymer bead, which comprises dispersing a monomer phase composed essentially of a monovinyl monomer and a crosslinkable monomer in an aqueous phase containing a dispersion stabilizer and subjecting the dispersion to suspension polymerization in an oil-in-water system in the presence of a polymerization initiator, wherein: ① at least one specific gravity-controlling agent having a specific gravity of more than 1.0 selected from the group consisting of water-insoluble inert organic solvents and water-insoluble linear polymers soluble in the monomer phase, is added to the monomer phase, and ② if necessary, at least one specific gravity-controlling agent selected from the group consisting of water-soluble inorganic salts, is added to the aqueous phase, ③ to adjust the specific gravities (at 25° C.) of the monomer phase and the aqueous phase in the ranges represented by the following formula (I):

$$B - 0.03 < A < B + 0.03 \qquad (I)$$

wherein A is the specific gravity of the monomer phase, and B is the specific gravity of the aqueous phase.

31 Claims, No Drawings

METHOD FOR PRODUCING A LARGE SIZE CROSSLINKED POLYMER BEAD

This application is a continuation of application Ser. No. 07/991,580, filed on Dec. 16, 1992, now abandoned.

The present invention relates to a method for producing a crosslinked polymer bead. More particularly, it relates to a large size crosslinked polymer bead having an average particle size of at least 1 mm by suspension polymerization in an oil-in-water system.

A bead product made of polymer beads, such as an ion exchange resin, a chelate resin or an adsorbent resin, usually has a particle size of from 0.1 to 1.0 mm and is used for various purposes.

When a large amount of a liquid is to be treated by such a resin, it is most effective to increase the amount of the liquid passed through the resin layer per unit time (i.e. the flow rate). However, in reality, if the flow rate is increased, the pressure loss of the resin layer increases, and the maximum flow rate is limited by the particle size of such a resin.

Further, in a case where a liquid containing a suspended substance is to be treated in a large amount, it is common to pass the liquid upwardly through the resin layer. In such a case, the treating amount can not be increased beyond the limit of the flow velocity at which the resin will not flow out. This limit of the flow velocity is governed by the particle size of the resin.

From the viewpoint of these problems, a resin of a large particle size is desired to treat a large amount of a liquid.

When a bead resin is used as an adsorbent for gas, the pressure loss in the adsorbent layer is desired to be zero. Accordingly, an adsorbent of a large particle size is desired also in this field.

On the other hand, for the production of polymer beads of large particle size, it is common to adopt a method of molding a polymer obtained by polymerization. However, such a moldable polymer is limited to the one having a linear structure. Such a linear polymer will be dissolved when it is converted to an ion exchange resin, a chelate resin or an adsorbent resin as the main objective of the present invention, whereby it is impossible to employ a molding method.

When an ion exchange resin, a chelate resin or an adsorbent resin is to be produced, polymer beads constituting it are required to have a crosslinked structure at the time of polymerization, for example, to have adequate strength. Accordingly, they are usually produced by suspension polymerization of a monovinyl monomer and a polyvinyl monomer.

Japanese Unexamined Patent Publication No. 11103/1989 discloses a method for obtaining a polymer of a large particle size by suspension polymerization. This publication discloses that a bead polymer of a large particle size can be obtained by a usual suspension polymerization wherein a polyvinyl monomer is from 4 to 30% by weight of the total amount of monomers, and a saturated aliphatic hydrocarbon is used as a poreimparting agent. It is disclosed that a porous structure is necessary, since breakage is otherwise likely to take place when the polymer is formed into an ion exchange resin. However, by a usual suspension polymerization method disclosed in this publication, a gel type polymer is not obtainable, and a desired resin of a large particle size can not necessarily be obtained. Further, the reproducibility is poor, and it is difficult to set the polymerization condition.

As a suspension polymerization method, suspension polymerization in an oil-in-water system is most common, whereby an oily monomer is suspended in water as a disperse phase, followed by polymerization to obtain polymer beads. To obtain polymer beads of a desired particle size by such suspension polymerization, it is common to properly adjust the stirring rotational speed. Stirring is applied for the purpose of uniformly dispersing in the disperse phase the monomer phase which will otherwise float or sediment in the disperse phase and for the purpose of shearing the monomer droplets by stirring to control the particle size. To obtain polymer beads of a large particle size, it is necessary to reduce the stirring rotational speed to weaken the shearing force against the monomer droplets. However, if the rotational speed is reduced too much, the monomer droplets will float or sediment in the disperse phase, whereby the dispersion will be non-uniform thus leading to a problem of agglomeration at the upper portion or the lower portion of the dispersion. Therefore, there is a limit in enlarging the particle size of the polymer (up to about 0.5 mm) by simply controlling the stirring rotational speed during suspension polymerization in the oil-in-water system, whereby it has been difficult to produce a polymer of a large particle size with an average particle size of at least 1 mm.

Under these circumstances, the present inventors have conducted extensive studies to provide a method for efficiently producing a large particle size bead crosslinked polymer useful as a material for an ion exchange resin, a chelate resin or an adsorbent resin. As a result, they have paid a particular attention to the difference in the specific gravity as between the aqueous phase and the monomer phase during the suspension polymerization. That is, in a common case of polymerization of styrene and divinylbenzene, the specific gravity of the monomer phase is as low as 0.91, while the specific gravity of the aqueous phase is 1.0. Even when various additives are added, the specific gravity of the monomer phase is always lower than that of the aqueous phase. Here, the present inventors have added a specific gravity-controlling agent to increase the specific gravity of the monomer phase, so that the specific gravities of the aqueous phase and the monomer phase are adjusted to be substantially at the same level, whereby it has been made unnecessary to exert an extra stirring force to disperse the monomer phase into the disperse phase, since the monomer phase will not float even when the stirring rotational speed during the suspension polymerization is reduced to obtain beads of a large particle size, it has been made possible to set the stirring rotational speed merely for the purpose of determining the particle size of the polymer beads, and it has been found possible to produce polymer beads of a desired large particle size. The present invention has been accomplished on the basis of this discovery.

Thus, the present invention provides a method for producing a large size crosslinked polymer bead, which comprises dispersing a monomer phase composed essentially of a monovinyl monomer and a crosslinkable monomer in an aqueous phase containing a dispersion stabilizer and subjecting the dispersion to suspension polymerization in oil-in-water system in the presence of a polymerization initiator, wherein:

① at least one specific gravity-controlling agent having a specific gravity of more than 1.0 selected from the group consisting of water-insoluble inert organic solvents and water-insoluble linear polymers soluble in the monomer phase, is added to the monomer phase, and ② if necessary, at least one specific gravity-controlling agent selected from the group consisting of water-soluble inorganic salts, is added to the aqueous phase, ③ to adjust the specific gravities (at 25° C.) of the monomer phase and the aqueous phase in the ranges represented by the following formula (I):

$$B-0.03 < A < B+0.03 \quad (I)$$

wherein A is the specific gravity of the monomer phase, and B is the specific gravity of the aqueous phase.

Now, the present invention will be described in detail with reference to the preferred embodiment.

In the present invention, a monomer mixture composed essentially of a monovinyl monomer and a crosslinkable monomer, is subjected to suspension polymerization in an oil-in-water system. The monovinyl monomer useful in the present invention may, for example, be an aromatic monovinyl monomer such as styrene, ethylstyrene, vinylxylene or vinylnaphthalene, or an aliphatic monovinyl monomer such as an acrylic acid ester, a methacrylic acid ester, acrylonitrile or methacrylonitrile. Among them, an aromatic monovinyl monomer, particularly styrene, is preferred.

On the other hand, the crosslinkable monomer may be a crosslinkable polyvinyl monomer which may be selected depending upon the desired polymer beads. It may, for example, be an aromatic polyvinyl monomer such as divinylbenzene, divinylnaphthalene, divinyltoluene, divinylxylene or trivinylbenzene, or an aliphatic polyvinyl monomer such as ethylene glycol diacrylate, ethylene glycol dimethacrylate, trimethylolpropane triacrylate, butylene glycol diacrylate or butylene glycol dimethacrylate. When an aromatic monovinyl monomer is employed, it is usually preferred to use an aromatic polyvinyl monomer, particularly divinylbenzene, as the crosslinkable monomer.

The amount of the crosslinkable monomer is not particularly limited, and an optional amount is used depending upon the desired properties of polymer beads. However, the amount is usually selected within a range of from 0.5 to 90% by weight relative to the total weight of monomers.

As the polymerization initiator, it is common to employ a known oil-soluble radical generating agent. It may usually be a peroxide catalyst such as benzoyl peroxide, lauroyl peroxide or tert-butylhydroxy peroxide, or an azo catalyst such as azobisisobutyronitrile.

The polymerization initiator is used usually within a range of from 500 to 30,000 ppm, preferably from 500 to 10,000 ppm, relative to the monomer component. Such an amount of the polymerization initiator gives no particular affect to the production of large size polymer beads of the present invention.

In the suspension polymerization of the present invention, a dispersion stabilizer is added to the aqueous phase as the disperse phase. This dispersion stabilizer may be a conventional one. For example, it may be a water-soluble polymer compound such as carboxymethyl cellulose, polyvinyl alcohol, gelatin or starch. The dispersion stabilizer is used usually in an amount of from 0.001 to 1% by weight, preferably from 0.01 to 0.1% by weight, relative to the monomer phase.

When the specific gravities (at 25° C.) of the above monomer phase and aqueous phase are compared, the specific gravity of the monomer phase is usually from 0.7 to 0.96 depending upon the types of the monomers, whereas the specific gravity of the aqueous phase is about 1.0. Accordingly, it is essential in the present invention that a specific gravity-controlling agent having a specific gravity of more than 1.0 is added to the monomer phase to adjust the difference in the specific gravity as between the monomer phase and the aqueous phase within the following ranges.

$$B-0.03 < A < B+0.03$$

preferably, $B-0.025 < A < B+0.025$ more preferably, $B-0.015 < A < B+0.015$ most preferably, $B < A < B+0.015$ In the above formulas, A is the specific gravity of the monomer phase, and B is the specific gravity of the aqueous phase.

Further, in the present invention, the specific gravity of the monomer phase is preferably adjusted within a range of from 1.01 to 1.2, more preferably from 1.01 to 1.05. By controlling the difference in the specific gravity as between the monomer phase and the aqueous phase to the above ranges by an addition of the specific gravity-controlling agent to the monomer phase, it is possible to efficiently produce a bead crosslinked polymer having a large particle size.

The specific gravity-controlling agent having a specific gravity of more than 1.0 to be added to the monomer phase, may be the one which is insoluble in water but soluble in the monomer phase and which is inert to the polymerization reaction. In the present invention, the specific gravity of the specific gravity-controlling agent is from 1.05 to 2.5, preferably from 1.1 to 1.8. Specifically, it may, for example, be a halogenated hydrocarbon such as ethylene dichloride, propylene dichloride, chlorobenzene, dichlorobenzene, carbon tetrachloride, chloroform, ethylene dibromide or propylene dibromide, preferably an aromatic halogenated hydrocarbon. Further, a halogenated linear polymer such as brominated linear polystyrene or chlorinated linear polystyrene may likewise be employed. In this case, the weight average molecular weight of such a halogenated linear polymer is usually from 5,000 to 200,000.

The above specific gravity-controlling agent is used in an amount such that the specific gravity of the monomer phase is thereby adjusted to the above-mentioned range relative to the aqueous phase. Usually, the amount is from 0.3 to 3 times by weight relative to the monomers. In the present invention, it is required simply to adjust the difference in the specific gravity between the aqueous phase and the monomer phase as described above. Therefore, if the specific gravity of the monomer phase is adjusted to be too high, an additive having a high specific gravity may be added to the aqueous phase to minimize the difference in the specific gravity.

The specific gravity-controlling agent to be added to the aqueous phase is usually a water-soluble inorganic salt such as sodium chloride, calcium chloride or sodium sulfate, preferably calcium chloride or sodium chloride. The amount of such a water-soluble inorganic salt is determined depending upon the specific gravity of the aqueous phase to be adjusted. However, it is usually from 0 to 30% by weight relative to water.

In the present invention, with the monomer phase and the aqueous phase adjusted as described above, suspension polymerization is conducted in an oil-in-water system. This polymerization can be conducted in accordance with a conventional method using a polymerization apparatus of a vessel with stirrer. Here, the stirring rotational speed is important. If the rotational speed is too low, it will be difficult to form monomer liquid droplets properly. On the other hand, if the rotational speed is too high, the shearing force will be increased, whereby it will be difficult to obtain a polymer of a large particle size. Therefore, the rotational speed is selected usually within a range of from 3 to 100 rpm, preferably from 3 to 30 rpm.

In the present invention, the ratio of the monomer phase to the aqueous phase is usually from 1.5 to 20 times by volume.

The polymerization temperature is usually from 60 to 90° C., and the polymerization time is usually from 5 to 20 hours.

According to the present invention, it is possible to produce a crosslinked polymer bead of either a gel type or a porous type. That is, in a case where an inert organic solvent is used as the specific gravity-controlling agent, when the crosslinkable monomer content in the monomer mixture is from 0.5 to 20 mol %, a polymer of a gel type is usually obtainable. When the crosslinkable monomer content is as high as from 20 to 90 mol %, particularly from 40 to 80 mol %, the inert solvent as the specific gravity-controlling agent serves also as a pore-forming agent, whereby porous polymer beads will be obtained. Further, in a case where a linear polymer is used as the specific gravity-controlling agent, the linear polymer in the resulting polymer beads may be extracted and removed after the polymerization to obtain a porous bead polymer.

Further, in the present invention, other pore-forming agent may positively be incorporated to the monomer phase, as the case requires. In such a case, it is of course necessary to control the specific gravity of the monomer phase to the above described range. As such a pore-forming agent, a solvent which is capable of dissolving the monomer but incapable of dissolving the resulting polymer, a linear polymer soluble in the monomer or a mixture of a linear polymer soluble in the monomer and a solvent capable of dissolving the resulting polymer, may be mentioned. When such a pore-forming agent is employed, it is necessary to remove such pore-forming agent from the polymer beads after the polymerization, in accordance with a conventional method.

A bead polymer obtained by the method of the present invention may be sieved, as the case requires, to obtain beads of a desired size.

By the suspension polymerization method of the present invention, the specific gravity of the monomer phase and the specific gravity of the aqueous phase are brought to be close to each other, whereby it will be unnecessary to forcibly stir the monomer phase for the purpose of dispersing it in the aqueous phase during polymerization, and the purpose of stirring may be restricted solely to control the particle size. Accordingly, it has been made possible to readily produce polymer beads having an average particle size as large as at least 1.0 mm, particularly from 1.5 to 6.0 mm, which can hardly be accomplished by conventional methods. Further, a large force is no longer required for stirring during the polymerization, which is advantageous from the viewpoint of energy consumption.

The crosslinked polymer bead of a large particle size produced by the present invention is of a gel type or a porous type and can be used as an ion exchange resin, a chelate resin or an adsorbent resin, whereby the pressure loss can be remarkably reduced, the flow rate can be increased, and the production efficiency can substantially be improved. Further, when used for the upward flow, the resin beads will not float even at a high flow rate, whereby the polymer can be advantageously used also as an ion exchange resin for catalytic use. Further, in a case of a porous bead polymer having a high cross-linked degree of from 40 to 80%, it can be used as an adsorbent for gas adsorption, whereby the pressure loss can be substantially reduced, and it is particularly suitable for use as an adsorbent for pressure swing adsorption. The pressure swing adsorption method is a separating method wherein the difference in the equilibrium adsorption of the respective components in a mixture as between the partial pressure under the adsorption pressure and the partial pressure under the desorption pressure, is utilized. Namely, the adsorbent is packed into an adsorption tower, and the substances to be adsorbed are adsorbed on the adsorbent under pressure. Desorption of the adsorbed substances is conducted by adjusting the pressure to a lower level. The polymer of the present invention prepared as described above is suitable for the separating method adopting such a pressure swing adsorption method. The substances to be adsorbed may, for example, be an organic solvent such as acetone, and $SO_3$, which can be adsorbed on the adsorbent, concentrated, recovered or separated, respectively.

The adsorbent of the present invention can be used for various apparatus adopting the pressure swing system. Such apparatus may be those disclosed in e.g. "Collection of Pressure Swing Adsorption Techniques" compiled by Toshinaga Kawai, published byKogyo Gijyutsukai in January 1986, or U.S. Pat. No. 4,857,084, which are incorporated herein by references. However, the apparatus are not limited to such specific apparatus. To use as an adsorbent for pressure swing adsorption, a bead polymer having a specific surface area of from 100 to 1,000 $m^2/g$ and a pore volume of from 0.5 to 3.0 $cm^3/g$ is usually preferred.

A crosslinked polymer bead of a large particle size produced by the method of the present invention may be used as an adsorbent by itself, as mentioned above. However, it can be used as a matrix which can be converted to an ion exchange resin or a chelate resin by introducing functional groups thereto. A conventional method may be used for introducing such functional groups. For example, when the matrix is a crosslinked polymer prepared by using styrene and divinylbenzene as monomers, it is possible to employ a method wherein the matrix is haloalkylated with e.g. chloromethylmethyl ether and then reacted with ammonia or an amine to obtain a basic resin, or a method wherein the matrix is sulfonated with a sulfonating agent to obtain a strongly acidic resin. A method for introducing such basic groups is disclosed, for example, in U.S. Pat. Nos. 2,992,544 and 4,207,398, which are incorporated herein by the reference, and a method of introducing such strongly acidic groups is disclosed, for example, in U.S.

Pat. No. 3,266,007, which is incorporated herein by the reference.

Now, the present invention will be described in further detail with reference to Examples. However, it should be understood that the present invention is by no means restricted to such specific Examples.

EXAMPLE 1

AS the monomer phase, a mixture comprising 2.5 g of styrene, 92.3 g of divinylbenzene for industrial use (purity: 57%), 181 g of chlorobenzene and 1 g of benzoyl peroxide, was prepared, and its specific gravity was measured and found to be 1.03.

As the aqueous phase, a mixture comprising 2,450 g of water, 0.4 g of polyvinyl alcohol and 98 g of sodium chloride, was prepared, and its specific gravity was measured and found to be 1.04.

Here, the difference between the specific gravity of the monomer phase and the specific gravity of the aqueous phase was 0.01.

Into a cylindrical 3 l flask equipped with a stirrer and a condenser, the aqueous phase was introduced, and then the monomer phase was introduced. The mixture was uniformly dispersed at a rotational speed of 40 rpm, followed by polymerization for 8 hours at a temperature of 80° C. The resulting polymer beads were washed with water and then with methanol to remove chlorobenzene and again washed with water to obtain polymer beads in a wet state. The particle size distribution of the polymer beads in a wet state was measured by means of JIS standard sieves, whereby the average particle size was found to be 1.80 mm.

COMPARATIVE EXAMPLE 1

Polymerization was conducted with the same monomer phase and aqueous phase as used in Example 1 except that no sodium chloride was added to the aqueous phase.

The difference between the specific gravity of the monomer phase and the specific gravity of the aqueous phase was 0.03.

The polymerization was conducted in the same manner as in Example 1, whereby the monomer phase sedimented and agglomerated at the bottom of the flask, and it was impossible to obtain spherical polymer beads.

COMPARATIVE EXAMPLE 2

With the composition of the monomer phase and aqueous phase adjusted to be the same as in Comparative Example 1, a study was made to determine the stirring rotational speed at which the monomer phase could be uniformly dispersed, whereby the minimum rotational speed at which the polymer would not agglomerate, was found to be 55 rpm.

The average particle size of the polymer beads obtained at this rotational speed was 0.98 mm.

COMPARATIVE EXAMPLE 3

As the monomer phase, a mixture comprising 2.5 g of styrene, 92.3 g of divinylbenzene for industrial use (purity: 57%), 142.2 g of toluene and 1 g of benzoyl peroxide, was prepared, and its specific gravity was measured and found to be 0.89.

As the aqueous phase, a mixture comprising 2,450 g of water and 0.4 g of polyvinyl alcohol, was prepared, and its specific gravity was measured and found to be 1.00.

Here, the difference between the specific gravity of the monomer phase and the specific gravity of the aqueous phase was 0.11. By means of the same polymerization apparatus as used in Example 1, polymerization was conducted at a stirring rotational speed of 40 rpm, whereby the monomer phase floated and agglomerated at the upper portion, and it was impossible to obtain spherical polymer beads.

COMPARATIVE EXAMPLE 4

With the composition of the monomer phase and aqueous phase adjusted to be the same as in Comparative Example 3, a study was made to determine the stirring rotational speed at which the monomer phase could uniformly be dispersed, whereby the rotational speed at which the polymer would not agglomerate, was found to be 110 rpm.

The average particle size of the polymer beads obtained at this rotational speed was 0.55 mm.

EXAMPLE 2

As the monomer phase, a mixture comprising 7.8 g of styrene, 286 g of divinylbenzene for industrial use (purity: 57%), 381 g of chlorobenzene and 2.9 g of benzoyl peroxide, was prepared, and its specific gravity was measured and found to be 1.01.

As the aqueous phase, a mixture comprising 2,025 g of water and 0.9 g of polyvinyl alcohol, was prepared, and its specific gravity was measured and found to be 1.00.

Here, the difference between the specific gravity of the monomer phase and the specific gravity of the aqueous phase was 0.01.

At a stirring rotational speed of 25 rpm, polymerization was conducted in the same manner as in Example 1. The average particle size of the resulting polymer beads was 2.10 mm.

EXAMPLE 3

As the monomer phase, a mixture comprising 6.9 g of styrene, 252 g of divinylbenzene for industrial use (purity: 57%), 415 g of chlorobenzene and 2.6 g of benzoyl peroxide, was prepared, and its specific gravity was measured and found to be 1.02.

As the aqueous phase, a mixture comprising 2,025 g of water and 0.9 g of polyvinyl alcohol, was prepared, and its specific gravity was measured and found to be 1.00.

Here, the difference between the specific gravity of the monomer phase and the specific gravity of the aqueous phase was 0.02.

At a stirring rotational speed of 25 rpm, polymerization was conducted in the same manner as in Example 1. The average particle size of the resulting polymer beads was 1.80 mm.

EXAMPLE 4

As the monomer phase, a mixture comprising 6.1 g of styrene, 227 g of divinylbenzene for industrial use (purity: 57%), 442 g of chlorobenzene and 2.3 g of benzoyl peroxide, was prepared, and its specific gravity was measured and found to be 1.03.

As the aqueous phase, a mixture comprising 2,025 g of water, 0.9 g of polyvinyl alcohol and 40 g of sodium chloride, was prepared, and its specific gravity was measured and found to be 1.02.

Here, the difference between the specific gravity of the monomer phase and the specific gravity of the aqueous phase was 0.01.

At a stirring rotational speed of 25 rpm, polymerization was conducted in the same manner as in Example 1. The average particle size of the resulting polymer beads was 2.01 mm.

EXAMPLE 5

As the monomer phase, a mixture comprising 2.5 g of styrene, 92.3 g of divinylbenzene for industrial use (purity: 57%), 190 g of propylene dichloride and 1.0 g of benzoyl peroxide, was prepared, and its specific gravity was measured and found to be 1.04.

As the aqueous phase, a mixture comprising 2,430 g of water, 0.4 g of polyvinyl alcohol and 120 g of sodium chloride, was prepared, its specific gravity was measured and found to be 1.05.

Here, the difference between the specific gravity of the monomer phase and the specific gravity of the aqueous phase was 0.01.

At a stirring rotational speed of 30 rpm, polymerization was conducted in the same manner as in Example 1. The average particle size of the resulting polymer beads was 1.89 mm.

EXAMPLE 6

As the monomer phase, a mixture comprising 220 g of styrene, 47 g of divinylbenzene for industrial use (purity: 57%), 342 g of chlorobenzene, 48 g of polystyrene and 1.4 g of benzoyl peroxide, was prepared, and its specific gravity was measured and found to be 1.02.

As the aqueous phase, a mixture comprising 1,970 g of water and 0.4 g of polyvinyl alcohol, was prepared, and its specific gravity was measured and found to be 1.00.

Here, the difference between the specific gravity of the monomer phase and the specific gravity of the aqueous phase was 0.02.

At a stirring rotational speed of 40 rpm, polymerization was conducted in the same manner as in Example 1. The average particle size of the resulting polymer beads was 1.40 mm.

The obtained polymer beads were chloromethylated by a conventional method (e.g. in accordance with the Example in U.S. Pat. No. 4,207,398) and further aminated with diethylene triamine to obtain a weakly basic anion exchange resin.

The average particle size of the obtained ion exchange resin was 1.78 mm.

EXAMPLE 7

To make the foregoing Examples and Comparative Examples readily understandable, the difference between the specific gravity of the monomer phase and the specific gravity of the aqueous phase (the difference in the specific gravity), the stirring rotational speed and the average particle size of the obtained polymer beads were summerized in Table 1.

TABLE 1

|  | Specific gravity of the monomer phase | Specific gravity of the aqueous phase | Difference in the specific gravity*[1] | Stirring rotational speed*[2] (rpm) | Average particle size*[3] (mm) |
|---|---|---|---|---|---|
| Example 1 | 1.03 | 1.04 | 0.01 | 40 | 1.80 |
| Example 2 | 1.01 | 1.00 | 0.01 | 25 | 2.10 |
| Example 3 | 1.02 | 1.00 | 0.02 | 25 | 1.80 |
| Example 4 | 1.03 | 1.02 | 0.01 | 25 | 2.01 |
| Example 5 | 1.04 | 1.05 | 0.01 | 30 | 1.89 |
| Example 6 | 1.02 | 1.00 | 0.02 | 40 | 1.40 |
| Comparative Example 1 | 1.03 | 1.00 | 0.03 | 40 | Agglomerated |
| Comparative Example 2 | 1.03 | 1.00 | 0.03 | 55*[4] | 0.98 |
| Comparative Example 3 | 0.89 | 1.00 | 0.11 | 40 | Agglomerated |
| Comparative Example 4 | 0.89 | 1.00 | 0.11 | 110*[4] | 0.55 |

*[1]Difference in the specific gravity: Difference between the specific gravity of the monomer phase and the specific gravity of the aqueous phase (at 25° C.)
*[2]Stirring rotational speed: *4 indicates the minimum rotational speed required for uniform dispersion.
*[3]Average particle size: Average particle size (diameter) of the obtained polymer beads.

What is claimed is:

1. A method for producing a large size crosslinked polymer bead having an average particle size of at least 1 mm, which comprises dispersing a monomer phase composed essentially of a monovinyl monomer and a crosslinkable monomer in an aqueous phase containing a dispersion stabilizer and subjecting the dispersion to suspension polymerization in an oil-in-water system in the presence of a polymerization initiator, wherein:

at least one specific gravity-controlling agent having a specific gravity of more than 1.0 selected from the group consisting of water-insoluble inert organic solvents and water-insoluble linear polymers soluble in the monomer phase, is added to the monomer phase to adjust the specific gravities (at 25° C.) of the monomer phase and the aqueous phase in the ranges represented by the following formula (I):

$$B - 0.03 < A < B + 0.03 \qquad (I)$$

wherein A is the specific gravity of the monomer phase, and B is the specific gravity of the aqueous phase, wherein the amount of the specific gravity-controlling agent added to the monomer phase is from 0.3 to 3 times by weight relative to the monomer mixture.

2. The method according to claim 1, wherein the crosslinked polymer bead produced has an average particle size of from 1.5 to 6.0 mm.

3. The method according to claim 1, wherein the suspension polymerization is conducted under stirring at a rotational speed of from 3 to 100 rpm.

4. The method according to claim 1, wherein the specific gravity-controlling agent having a specific gravity of more than 1.0 selected from water-insoluble inert organic solvents is a halogenated hydrocarbon.

5. The method according to claim 4, wherein the halogenated hydrocarbon is an aromatic halogenated hydrocarbon.

6. The method according to claim 4, wherein the halogenated hydrocarbon is chlorobenzene, ethylene dichloride or propylene dichloride.

7. The method according to claim 1, wherein the specific gravity-controlling agent having a specific gravity of more than 1.0 selected from water-insoluble linear polymers soluble in the monomer phase is a halogenated linear polystyrene.

8. The method according to claim 7, wherein the water-insoluble linear polymer has a weight average molecular weight from 5,000 to 200,000.

9. The method according to claim 1, wherein the specific gravity-controlling agent added to the monomer phase, has a specific gravity within a range of from 1.05 to 2.5.

10. The method according to claim 1, wherein the specific gravity of the monomer phase is adjusted to be within a range of from 1.01 to 1.2.

11. The method according to claim 1, wherein the ratio of the aqueous phase to the monomer phase is from 1.5 to 20 times by volume.

12. The method according to claim 1, wherein the polymerization temperature is from 60° to 90° C.

13. The method according to claim 1, wherein the specific gravity of the monomer phase used as the starting material is from 0.7 to 0.96.

14. The method according to claim 1, wherein the monovinyl monomer is an aromatic monovinyl monomer.

15. The method according to claim 14, wherein the aromatic monovinyl monomer is styrene.

16. The method according to claim 1, wherein the crosslinkable monomer is an aromatic vinyl monomer.

17. The method according to claim 16, wherein the aromatic vinyl monomer is divinylbenzene.

18. The method according to claim 1, wherein the amount of the crosslinkable monomer is from 0.5 to 90% by weight relative to the total amount of the monomers.

19. The method according to claim 1, wherein the polymerization initiator is an oil-soluble peroxide.

20. The method according to claim 19, wherein the polymerization initiator is benzoyl peroxide.

21. The method according to claim 19, wherein the amount of the polymerization initiator is from 500 to 10,000 ppm relative to the monomer mixture.

22. The method according to claim 1, wherein the dispersion stabilizer is a water-soluble polymer compound.

23. The method according to claim 1, wherein the dispersion stabilizer is polyvinyl alcohol, carboxy methylcellulose, gelatin or starch.

24. The method according to claim 1, wherein the amount of the dispersion stabilizer is from 0.001 to 1% by weight relative to water.

25. The method according to claim 1, wherein the specific gravities of the monomer phase and the aqueous phase are adjusted to be in the ranges represented by the following formula:

$$B-0.025 < A < B+0.025$$

wherein A and B are as defined in claim 1.

26. The method according to claim 1, wherein the specific gravities of the monomer phase and the aqueous phase are adjusted to be in the ranges represented by the following formula:

$$B-0.015 < A < B+0.015$$

wherein A and B are as defined in claim 1.

27. The method according to claim 1, wherein the amount of the crosslinkable monomer to the total amount of the monomers is from 20 to 90 mol %, and the resulting bead polymer is of a porous type.

28. The method according to claim 27, wherein the bead polymer has a pore volume of from 0.5 to 3.0 cm$^3$/g, a specific surface area of from 100 to 1,000 m$^2$/g and an average particle size of from 5 to 6.0 mm.

29. The method according to claim 1, wherein:
(1) at least one specific gravity-controlling agent having a specific gravity of more than 1.0, selected from the group consisting of water-insoluble inert organic solvents and water-insoluble linear polymers, soluble in the monomer phase, is added to the monomer phase, and
(2) at least one specific gravity-controlling agent selected from the group consisting of water-soluble inorganic salts, is added to the aqueous phase,
(3) to adjust the specific gravities (at 25° C.) of the monomer phase and the aqueous phase in the ranges represented by the following formulas (I):

$$B-0.03 < A < B+0.03 \qquad (I)$$

wherein A is the specific gravity of the monomer phase, and B is the specific gravity of the aqueous phase.

30. The method according to claim 29, wherein the specific gravity-controlling agent selected from the group consisting of water-soluble inorganic salts, is sodium chloride or calcium chloride.

31. The method according to claim 29, wherein the amount of the specific gravity-controlling agent selected from the group consisting of water-soluble inorganic salts, is from 0 to 30% by weight relative to water.

* * * * *